(No Model.)

T. M. McDONOUGH.
AUTOMATIC HORSE BED.

No. 337,070. Patented Mar. 2, 1886.

Witnesses.

T. Milner McDonough
Inventor
Connolly Brot McTighe
Attorneys.

UNITED STATES PATENT OFFICE.

T. MILNER McDONOUGH, OF PITTSBURG, PENNSYLVANIA.

AUTOMATIC HORSE-BED.

SPECIFICATION forming part of Letters Patent No. 337,070, dated March 2, 1886.

Application filed May 6, 1885. Serial No. 164,589. (No model.)

*To all whom it may concern:*

Be it known that I, T. MILNER McDONOUGH, of Pittsburg, in the county of Allegheny and State of Pennsylvania, have invented certain new and useful Improvements in Automatic Horse-Beds; and I do hereby declare that the following is a full, clear, and exact description of the invention, which will enable others skilled in the art to which it appertains to make and use the same, reference being had to the accompanying drawings, which form a part of this specification.

In the care of stock, especially horses, during the night, a humane principle has dictated that while in their stalls they shall be comfortably bedded, which is usually done by spreading a bunch of straw or other material on the floor of the stall, which is removed in the morning. This serves its purpose, but is more or less filthy, since the excreta of the beast are apt to become mingled with its bedding and soak into or find lodgment in the hide, and are hard to thoroughly cleanse. In addition, the humane object is not always fulfilled, through forgetfulness or neglect of the attendant.

The object of the present invention is to secure a more cleanly bedding for the beast, and to make the setting of the bedding automatic and dependent upon the attempt of the beast to lie down, so that previous to lying down the urine or dung cannot be voided upon the bedding, and the latter will be preserved clean.

To these and other ends my invention consists in a permanent form of bedding, preferably a mattress covered with rubber-cloth or oil-cloth, so arranged in connection with some part of the harness that the effort of the beast to lie down shall operate to swing the mattress or mattresses under it; and, further, in the construction and operation of devices to that end, substantially as hereinafter described and claimed.

Figure 1:
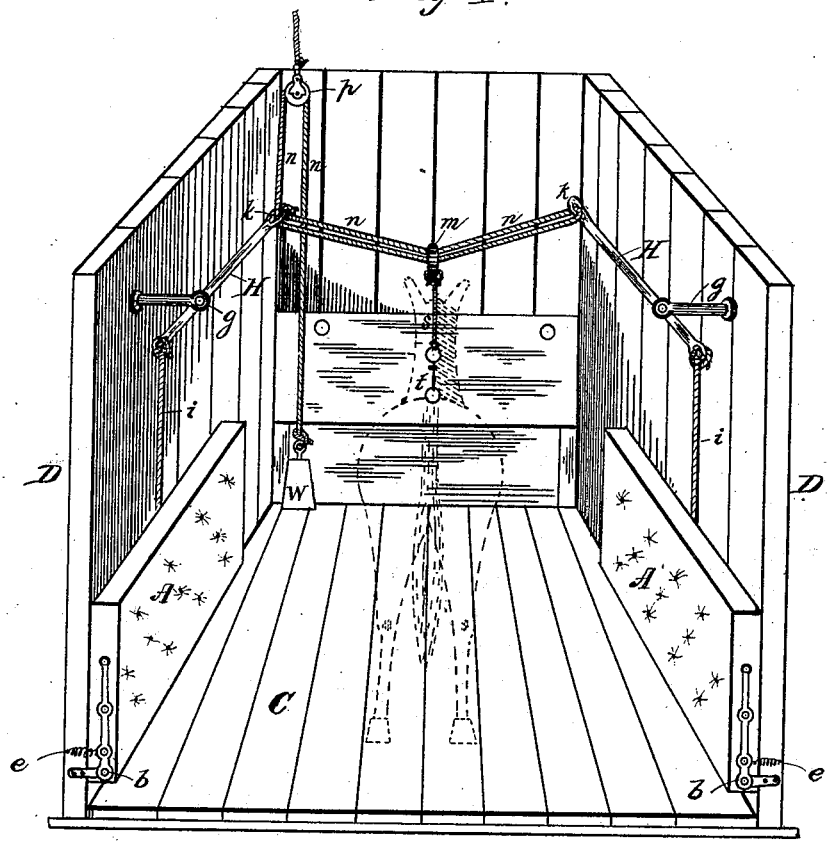
Figure 2:
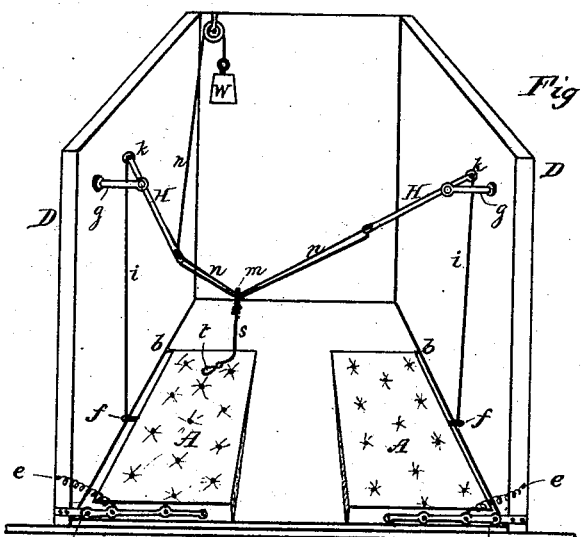
Figure 3:

In the drawings, Figure 1 is a perspective of a stall fitted with my improved form of horse-bedding as set for use in day-time, the horse being indicated in broken lines. Fig. 2 shows the same with the bedding in position, set by the attempt of the horse to lie down, the horse, for the sake of clearness, being omitted. Fig. 3 is a detail.

The bedding consists of the mattresses A, held in suitable frames and hinged at *b* to the floor C or walls D of the stall, and provided with retractile springs *e*, whose function is to elevate the mattresses (when the horse rises) into the position shown in Fig. 1. These mattresses are of sufficient length and width to accommodate the horse whether it lies on the right or left side, and at the same time leave a sufficient space for it to stand in free of the mattresses. At the rear of each mattress I fix an arm, *f*, projecting laterally beyond the hinge-axis *b*. (See Fig. 3.)

On the side wall, D, at a point sufficiently above the mattress A, I fix a bracket or pin, *g*, in which is pivoted a lever, H, whose longer arm projects outwardly toward the middle of the stall-space. These levers H at their inner ends are provided with a rope or chain, *i*, which extends thence to the arm *f*, and their inner ends have eyes *k*, which form the point of connection for the operating-gear, as follows: I fasten one end of a small rope, *n*, to the end of one of the levers H, as shown in Fig. 1, pass it through a ring, *m*, over to the other lever H, through its eye, back again through ring *m*, and over through the eye of the first lever H, whence it rises to and passes over a pulley or sheave, *p*, suitably fixed to the ceiling or overhead beams, and carries at its other end a weight, W. Ring *m* is provided with a depending link or bight of rope, *s*, fitted with a hook, *t*, for attachment to the girth or other part of the stall-harness of the horse. The weight is merely intended to take up the slack of the rope *n* and raise the levers H, in order to lift them out of the way as the horse rises, and to take away all work from the springs *e* beyond that of lifting the mattresses, and they could be even assisted by substituting rods for the ropes or chains *i*. By this arrangement, so long as the horse remains standing the mattresses will stay in a vertical position snugly against walls D, so as to leave the entire stall to the horse, if it wants to move about. When about to lie down, the horse will naturally take a position about central in the stall, and as soon as it begins to relax its legs to lie down the link *s* and ring *m* act upon the levers H and draw them downwardly, thus throwing mattresses A partly down, and the dropping of the horse farther will continue the movement till, finally, the horse strikes the mattress and drives it down underneath, the weight W meantime, or immediately, acting through rope m to restore the other mattress to its upright position, and leave that side of the stall free for the movement of the animal's legs, and clear for the voidance of urine.

Though shown double, the device may be applied to only one side of the stall, as desired, with such modifications as may be necessary.

The mattress is readily cleaned, and will not soak up the beast's excreta to any disagreeable extent, and the proper bedding is always insured.

I claim as my invention—

1. In an animal-stall, the combination, with the side of the stall, of a mattress hinged thereto, a spring retaining said mattress in a vertical position, a belt adapted to be applied to an animal, and suitably arranged rope and lever connections between said mattress and belt, whereby when the animal attempts to lie down the mattress will be pulled down upon the floor of the stall, substantially as described.

2. The combination, with an animal-stall, of the mattresses A A, hinged to the sides of the stall, and provided with springs e e, the ropes i i, levers H H, and a rope, n, connecting said levers, and adapted to be attached to a horse, whereby when said rope is drawn down the mattresses will assume a horizontal position, and when the rope is relaxed will automatically assume a vertical position, as set forth.

3. The combination, with an animal-stall, of the hinged mattresses A A, the hinged levers H H, the ropes i i, the rope n, pulley p, weight W, and ring m, all constructed and arranged substantially as shown and described.

In testimony that I claim the foregoing as my own I have hereto affixed my signature in presence of two witnesses.

T. MILNER McDONOUGH.

Witnesses:
ALVA A. MOORE,
JNO. F. ATCHESON.